US012664018B2

(12) United States Patent (10) Patent No.: US 12,664,018 B2
Alt et al. (45) Date of Patent: Jun. 23, 2026

(54) SYSTEM AND METHOD FOR ESTIMATING JOB SCALABILITY ON A COMPUTING DEVICE

(71) Applicant: Advanced Micro Devices, Inc., Santa Clara, CA (US)

(72) Inventors: Max Alt, San Francisco, CA (US); Paulo Roberto Pereira de Souza filho, Maringa (BR)

(73) Assignee: Advanced Micro Devices, Inc., Santa Clara, CA (US)

( * ) Notice: Subject to any disclaimer, the term of this patent is extended or adjusted under 35 U.S.C. 154(b) by 355 days.

(21) Appl. No.: 17/400,579

(22) Filed: Aug. 12, 2021

(65) Prior Publication Data

US 2022/0050718 A1 Feb. 17, 2022

Related U.S. Application Data

(60) Provisional application No. 63/064,589, filed on Aug. 12, 2020.

(51) Int. Cl.
*G06F 9/50* (2006.01)
*G06F 9/46* (2006.01)
(52) U.S. Cl.
CPC ............ *G06F 9/5005* (2013.01); *G06F 9/466* (2013.01)
(58) Field of Classification Search
CPC ...... G06F 9/5005; G06F 9/466; G06F 9/5066; G06F 11/3404; G06F 9/3885
See application file for complete search history.

(56) References Cited

U.S. PATENT DOCUMENTS 5,072,371 A * 12/1991 Benner ............. G06F 15/17368
712/21
6,772,106 B1 * 8/2004 Mahlke ............... G06F 11/3461
703/22

(Continued)

FOREIGN PATENT DOCUMENTS

CN 111104198 A * 5/2020
JP 2001125784 A * 5/2001

(Continued)

OTHER PUBLICATIONS

Fukushi et al, JP2001125784A Description Translation, May 11, 2001, [database online], [retrieved on Feb. 23, 2023] Retrieved from Espacenet using Internet <URL:https://worldwide.espacenet.com/publication Details/description?CC=JP&NR=2001125784A&KC=A&FT=D&ND=3&date=20010511&DB=&locale=en_EP>, pp. 1-11 (Year: 2001).*

(Continued)

*Primary Examiner* — Aimee Li
*Assistant Examiner* — Hsing Chun Lin
(74) *Attorney, Agent, or Firm* — Fishman Stewart PLLC

(57) ABSTRACT

Systems and methods for estimating the scalability of applications in high performance computing and distributed computing environments and for configuring applications based on those estimates are disclosed. A model is disclosed that provides an estimate of the scalability behavior of an application based on basic parameters and a small number of runs on bare metal and cloud systems. The system may also be configured to use the estimated performance to recommend optimal configurations based on different policies, including best performance, lowest cost, and best performance per cost.

18 Claims, 5 Drawing Sheets

(56) References Cited

U.S. PATENT DOCUMENTS

| | | | |
|---|---|---|---|
| 7,617,498 B1 | 11/2009 | Lumsden | |
| 8,286,177 B2 | 10/2012 | Hollingsworth | |
| 9,298,493 B1 * | 3/2016 | Harel | G06F 9/46 |
| 10,248,400 B1 * | 4/2019 | Coleman | G06F 8/71 |
| 10,891,290 B2 * | 1/2021 | Morris | G06F 16/24542 |
| 2008/0082933 A1 * | 4/2008 | Howard | G06F 9/5072 |
| | | | 712/30 |
| 2008/0178127 A1 * | 7/2008 | Dewkett | G06F 30/30 |
| | | | 716/132 |
| 2009/0006070 A1 | 1/2009 | Sasatani et al. | |
| 2011/0191782 A1 * | 8/2011 | Kim | G06F 9/50 |
| | | | 718/104 |
| 2014/0089917 A1 | 3/2014 | Attalla et al. | |
| 2016/0217003 A1 * | 7/2016 | Ailamaki | G06F 16/24542 |
| 2017/0236072 A1 * | 8/2017 | Rendle | G06N 20/00 |
| | | | 706/12 |
| 2018/0113965 A1 * | 4/2018 | Harris | G06F 30/20 |
| 2018/0210762 A1 * | 7/2018 | Inada | G06F 9/5066 |
| 2020/0042338 A1 * | 2/2020 | Poothia | G06F 12/023 |
| 2020/0073739 A1 | 3/2020 | Rungta et al. | |
| 2020/0081740 A1 * | 3/2020 | Wada | G06F 9/5016 |
| 2020/0241929 A1 * | 7/2020 | Arrasjid | H04L 43/08 |
| 2021/0157660 A1 * | 5/2021 | Hershkovitz | G06F 11/3476 |
| 2021/0216330 A1 * | 7/2021 | Raghavan | G06F 9/44505 |
| 2022/0021589 A1 * | 1/2022 | Song | H04W 88/18 |
| 2022/0083709 A1 * | 3/2022 | Mohan | G06F 9/5005 |

FOREIGN PATENT DOCUMENTS

| | | | | | |
|---|---|---|---|---|---|
| JP | 2002358201 | A | * | 12/2002 | |
| JP | 2004341750 | A | * | 12/2004 | |
| JP | 2007058253 | A | * | 3/2007 | |
| KR | 20080052339 | A | * | 6/2008 | |
| WO | WO-2016114771 | A1 | * | 7/2016 | |
| WO | WO-2017022077 | A1 | * | 2/2017 | H02J 13/00 |

OTHER PUBLICATIONS

Jinguji, JP2002358201A Description Translation, Dec. 13, 2002, [database online], [retrieved on Feb. 23, 2023] Retrieved from Espacenet using Internet <URL:https://worldwide.espacenet.com/publication Details/description?CC=JP&NR=2002358201A&KC=A&FT=D&ND=3&date=20021213&DB=&locale=en_EP>, pp. 1-14 (Year: 2002).*

Lee et al, KR20080052339A Desription Translation, Jun. 11, 2008, [database online], [retrieved on Feb. 23, 2023] Retrieved from Espacenet using Internet <URL:https://worldwide.espacenet.com/publicationDetails/description?CC=KR&NR=20080052339A&KC=A&FT=D&ND=3&date=20080611&DB=&locale=en_EP>, pp. 1-8 (Year: 2008).*

Monteil, Thierry, Coupling profile and historical methods to predict execution time of parallel applications, Nov. 12, 2015, [retrieved on Feb. 23, 2023] Retrieved from <URL:https://hal.science/hal-01228236/document>, pp. 1-10 (Year: 2015).*

Lobachev et al. Estimating Parallel Performance, A Skeleton-Based Approach, Sep. 25, 2010, Retrieved from <URL:https://dl.acm.org/doi/pdf/10.1145/1863482.1863489>, pp. 25-33 (Year: 2010).*

Boyd-Wickizer et al. An Analysis of Linux Scalability to Many Cores, Oct. 4, 2010, Retrieved from <URL:https://www.usenix.org/legacy/events/osdi10/tech/full_papers/Boyd-Wickizer.pdf>, pp. 1-16 (Year: 2010).*

Fujii et al. JP2007058253A Description Translation, Mar. 8, 2007, [database online], [retrieved on Feb. 23, 2023] Retrieved from Espacenet using Internet <URL:https://worldwide.espacenet.com/publicationDetails/description?CC=JP&NR=2007058253A&KC=A&FT=D&ND=3&date=20070308&DB=&locale=en_EP>, pp. 1-34 (Year: 2007).*

Qi, Zengtian CN111104198A Description Translation, May 5, 2020, [database online], [retrieved on Feb. 23, 2023] Retrieved from Espacenet using Internet <URL:https://worldwide.espacenet.com/publication Details/description?CC=CN&NR=111104198A&KC=A&FT=D&ND=3&date=20200505&DB=&locale=en_EP>, pp. 1-14 (Year: 2020).*

Sato et al. WO2017022077A1 Description Translation, Feb. 9, 2017 [database online], [retrieved on Sep. 8, 2023] Retrieved from Espacenet using Internet <URL:https://worldwide.espacenet.com/publication Details/description?CC=WO&NR=2017022077A1&KC=A1&FT=D&ND=3&date=20170209&DB=&locale=en_EP>, pp. 1-14 (Year: 2017).*

Bhatia, Performance Analysis, Oct. 11, 2011, <http://www.cs.umsl.edu/~sanjiv/classes/cs5740/lectures/>, pp. 1-10 (Year: 2011).*

Shigeo, JP2004341750A Translation, Dec. 2, 2004, <https://www.j-platpat.inpit.go.jp/s0100>, pp. 1-29 (Year: 2004).*

International Search Report and Written Opinion dated Nov. 15, 2021 for International Patent Application No. PCT/US21/44347.

* cited by examiner

MEASURE PERFORMANCE ON TEST RUNS — 400

ESTIMATE PROBLEM SIZE FOR JOB — 410

DETERMINE AVAILABLE MEMORY PER NODE — 420

ESTIMATE EXECUTION TIME — 430

CALCULATE NUMBER OF NODES FOR BEST PERFORMANCE — 440

CALCULATE NUMBER OF NODES FOR LOWEST COST — 450

CALCULATE NUMBER OF NODES FOR BEST PERFORMANCE PER COST — 460

ESTIMATE AND DISPLAY RUNTIME, COST FOR EACH OPTION — 470

SYSTEM AND METHOD FOR ESTIMATING JOB SCALABILITY ON A COMPUTING DEVICE

CROSS-REFERENCE TO RELATED APPLICATIONS

This application claims the benefit of, and priority to, U.S. Provisional Application Ser. No. 63/064,589, filed Aug. 12, 2020, titled "SCALABILITY ADVISOR", the disclosure of which is hereby incorporated herein by reference in its entirety and for all purposes.

TECHNICAL FIELD

The present disclosure generally relates to the field of computing and, more particularly, to systems and methods for estimating performance scalability of applications in high performance computing environments.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Distributed computing was born from the necessity of processing problems that did not fit in the global memory of a single computer or that required higher amount of computational power than that available from a single computer. Distributed computing systems have evolved to address the needs of these ever-larger processing problems. Modern distributed computing systems have multiple computers (e.g., nodes) connected via network. Distributed applications have evolved as well, and they divide the processing problems into smaller problems that can be distributed to different nodes in the distributed computing system for execution. They often use frameworks such as Message Passing Interface (MPI) that permit execution to occur in parallel and enable nodes to pass messages to each other over the network in order to coordinate their work. Examples of distributed computing systems include high performance computing (HPC) systems and cloud computing systems.

Many cloud computing solutions are based on virtualization technology, which enables multiple applications or workloads to share the same physical computing resources (e.g., a server) while remaining safely isolated from one another. This ability is a key to enabling cost-effective cloud computing and allows users of cloud computing to design virtual systems with a desired number of virtual processors and access to a specific amount of memory and storage. Virtualization may add some processing overhead, and it also makes performance modeling more difficult due to potential inconsistencies (e.g., impact of other virtual machines, or different runs being assigned to different physical machines).

Currently, configuring a distributed application to run optimally on a distributed computing system can be difficult, especially for non-expert users. For example, the optimal configuration for an application requires specifying the number of nodes and tasks (e.g., threads), which may depend on many different variables that may interact in very complex ways, such as the network bandwidth and latency, the amount of memory per node, the number and structure of the cache levels, and so on. An optimal configuration is typically one where the number of nodes balance computational power and communication overhead for the application in question.

Finding the optimal configuration typically requires developing complex models based on a deep understanding of the application and the system of interest, plus a significant amount of effort to run large numbers of test runs of the applications with different configurations in order to train the model and fit the parameters. This is a time-consuming and inefficient process, and in many cases the number of possible configurations to be tested is prohibitively large. Furthermore, the optimal solution for each particular user may vary based on their particular requirements. For example, one user might desire to run their application as fast as possible, another user might be interested in running their application in the cheapest possible way, while a third user might desire to strike a balance between execution time and cost (e.g., best performance option that provides the best performance per dollar). Even for users wanting their application to run as fast as possible, there will typically be a point beyond which adding more resources does not materially increase the speed at which the application is executed. Since adding computing resources (e.g., adding additional processors in bare metal or cloud systems) can be very expensive, having information on how well an application scales and where that point of diminishing returns is can result in significant savings.

For at least these reasons, an improved system and method for determining application scalability on high performance and distributed computing systems is desired.

SUMMARY

Improved systems and methods for estimating the scalability of applications in high performance computing and distributed computing environments and for configuring applications based on those estimates are disclosed. A usable model is disclosed to provide an estimation of the scalability behavior of any application based on basic parameters and a small number of runs.

In one embodiment, the system provides an estimation of the range of computing nodes under which a job will have a reasonable performance, together with an estimated performance function depending on the number of nodes for that specific range, based on a set of historical performance information. Beneficially, the set of historical data can be based on prior production runs of the application, or one or more test runs of the application if no data from prior production runs is available. While three or more runs are desirable for increased accuracy, as little as one test run may be used. The runs may be shorter (e.g., a shorter amount of time or processing less data than a full production run of the application), but all major phases of the application (e.g., fetching data, preprocessing, processing, and postprocessing) may be represented in some embodiments.

Furthermore, the system may also be configured to use the estimated performance to recommend the best available configurations for at least the following different policies: (i) best performance, (ii) lowest cost, and (iii) best performance per cost.

In some embodiments the method may comprise estimating a problem size for a job, determining available memory for the cores in the computing system, calculating an estimated execution time for the job, calculating estimates of the number of cores for best performance, lowest cost, and best performance per cost, and then displaying the estimates for the user. Determining the available memory may for example be performed on a per-core or per-thread basis. The problem size may for example be estimated from a previous run of the job based on a total RAM memory usage without the cores paging. The method may for example be implemented in a non-transitory, computer-readable storage medium (e.g., DVD, flash-based SSD, or hard disk) that stores instructions executable by a processor of a computational device such as a computer or management server.

In some embodiments, the estimated execution time may for example be based on (i) a serial time estimate for the job that does not scale with a number of nodes allocated to the job, (ii) a parallel time estimate that scales with the number of nodes allocated to the job, and (iii) a network overhead estimate that is proportional to the number of nodes allocated to the job. The serial and parallel time estimates and the network overhead estimate may for example be based on performance measurements taken from one or more prior executions of the job on the computer system, or on other computer systems having similar cores and available memory per core.

In some embodiments, one or more test runs of the job may be performed with performance instrumentation, wherein if the number of test runs is less than three, calculating the serial time estimate based on a sum of time spent by the nodes allocated to the job sending or receiving messages plus time spent by the job in disk operations divided by the number of nodes allocated to the job, and calculating the parallel time estimate based on a total job time divided by the number of nodes allocated to the job minus the serial time. Estimated costs for the best performance, lowest cost, and best performance per cost options may also be calculated and displayed to the user.

A system for estimating an application's scalability in a computer system is also contemplated. In some embodiments the system may comprise an estimator that estimates a problem size for a job, a memory checker that determines available memory for each thread in the computing system, and an execution time estimator that estimates an execution time for the application. A thread calculator may be used to calculate (i) an estimated number of threads for a best performance option, (ii) an estimated number of threads for a lowest cost option, and (iii) an estimated number of threads for a best performance per cost option, and a display that displays the estimates.

In some embodiments, a performance checker may also be used to run one or more test workloads to measure one or more performance metrics for one or more cloud environments. The execution time estimator may estimate execution times for the application based on those performance metrics. The performance checker may collect the performance metrics for the application once the application is being executed, wherein the execution time estimator estimates a second execution time for a second application based on the performance metrics. The performance checker may for example collect performance metrics for the application when the application is being executed in a cloud environment.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
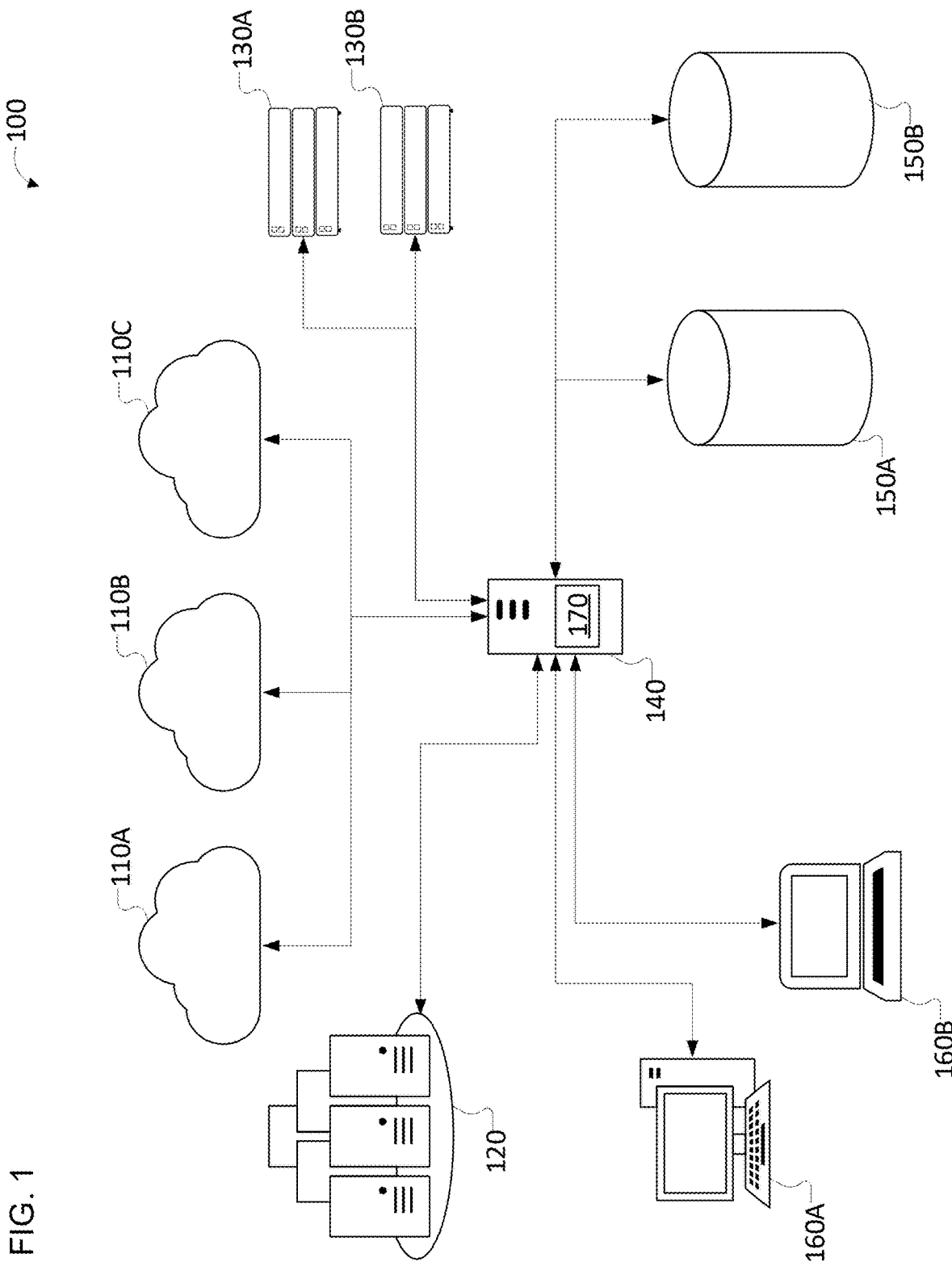
FIG. 1 is an illustration of one example of a distributed computing system.

Turning now to FIG. 1, an example of a distributed computing system 100 is shown. In this example, the distributed computing system 100 is managed by a management server 140, which may for example provide access to the distributed computing system 100 by providing a platform as a service (PAAS), infrastructure as a service (IAAS), or software as a service (SAAS) to users. Users may access these PAAS/IAAS/SAAS services from their on-premise devices such as user devices 160A and 160B, e.g., network-connected PCs, workstations, servers, laptops or mobile devices via a web interface.

Management server 140 is connected to a number of different computing devices via local or wide area network connections. This may include, for example, cloud computing providers 110A, 110B, and 110C. These cloud computing providers may provide cloud environments with access to large numbers of computing devices (often virtualized) with different configurations. For example, systems with a one or more virtual CPUs may be offered in standard configurations with predetermined amounts of accompanying memory and storage. In addition to cloud computing providers 110A, 110B, and 110C, management server 140 may also be configured to communicate with bare metal computing devices 130A and 130B (e.g., non-virtualized servers), as well as a data center 120 including for example one or more high performance computing (HPC) systems (e.g., each having multiple nodes organized into clusters, with each node having multiple processors and memory), and storage systems 150A and 150B. Bare metal computing devices 130A and 130B may for example include workstations or servers optimized for machine learning computations and may be configured with multiple CPUs and GPUs and large amounts of memory. Storage systems 150A and 150B may include storage that is local to management server 140 and well as remotely located storage accessible through a network such as the internet. Storage systems 150A and 150B may comprise storage servers and network-attached storage systems with non-volatile memory (e.g., flash storage), hard disks, and even tape storage.

Management server 140 is configured to run a distributed computing management application 170 that receives jobs and manages the allocation of resources from distributed computing system 100 to run them. Management application 170 is preferably implemented in software (e.g., instructions stored on a non-volatile storage medium such as a hard disk, flash drive, or DVD-ROM), but hardware implementations are possible. Software implementations of management application 170 may be written in one or more programming languages or combinations thereof, including low-level or high-level languages, with examples including Java, Ruby, JavaScript, Python, C, C++, C#, or Rust. The program code may execute entirely on the management server 140, partly on the management server 140 and partly on other computing devices in distributed computing system 100.

The management application 170 provides an interface to users (e.g., via a web application, portal, API server or command line interface) that permits users and administrators to submit applications/jobs via their user devices 160A and 160B such as workstations, laptops and mobile devices, designate the data sources to be used by the application, designate a destination for the results of the application, and set one or more application requirements (e.g., parameters such as how many processors to use, how much memory to use, cost limits, application priority, etc.). The interface may also permit the user to select one or more system configurations to be used to run the application. This may include selecting a particular bare metal or cloud configuration (e.g., use cloud A with 24 processors and 512 GB of RAM).

Management server 140 may be a traditional PC or server, a specialized appliance, or one or more nodes within a cluster. Management server 140 may be configured with one or more processors, volatile memory, and non-volatile memory such as flash storage or internal or external hard disk (e.g., network attached storage accessible to management server 140).

Management application 170 may also be configured to receive computing jobs from user devices 160A and 160B, determine which of the distributed computing system 100 computing resources are available to complete those jobs, make recommendations on which available resources best meet the user's requirements, allocate resources to each job, and then bind and dispatch the job to those allocated resources. In one embodiment, the jobs may be applications operating within containers (e.g., Kubernetes with Docker containers) or virtualized machines.

Unlike prior systems, management application 170 may be configured to provide users with information about the predicted relative performance of different configurations in clouds 110A-C and bare metal systems in data center 120 and systems/devices 130A and 130B. These predictions may be based on information about the specific application the user is planning to execute. In some embodiments the management application 170 may make recommendations for which configurations (e.g., number of processors, amount of memory, amount of storage) best match a known configuration from the user or which bare metal configurations best match a particular cloud configuration.

When optimizing the performance of distributed system two factors play major roles: the memory system and the network. Communicating between different processes on different nodes through a network is expensive in computational terms compared with communicating through memory. Generally, for a fixed job with a fixed problem size, the more nodes that are performing the distributed work, the more network communication is required, and the less amount of work is able to be performed in each node due to communication delay and overhead. This increases until a point is reached at which the application no longer scales, i.e., the time to complete the job does not decrease when adding more nodes, and in some cases, it might even increase due to the network overhead. On the other hand, for a fixed job with a fixed problem size, as the number of nodes is reduced, the amount of data to be processed by each node increases. At some point, the number of nodes becomes so small that the job is not actually able to run. Another possibility is that the data to be processed by each node does not fit in the available main memory of the node, thereby forcing the node to use disk paging for the data that does not fit into memory, which drastically reduces the performance of the job. Another possibility when too few nodes are used is that the data fits in memory, but the amount of data that has to be moved from memory to the CPU saturates the cache system, negatively impacting and bounding the performance of the application.

For these reasons, to perform reasonably well, the practical range of the number of nodes for a job with a fixed problem size is minimum bounded by job's memory requirements and maximum bounded by the scalability of the application.

Fortunately, profiling tools are available to measure the resources usage of a computer system without introducing significant overhead. Some like the Linux perf tool provide information from the CPU-memory system such as hardware counters, while others like the PMPI Profiling Interface permit interception of every MPI call made in a parallel program, which provides information about the communication time and patterns of the application while executing. Finally, overall system resources monitoring tools are also available and may provide useful information about overall memory, disk, CPU, and network utilization. Using these tools and the methods described herein, useful estimates of the aforementioned minimum and maximum bounds can be determined.

Conceptually, a computer program can be divided in two parts: (i) the portion of the program that cannot be computed in parallel (s), and (ii) the portion of the program that can be parallelized (p). According to Amdahl's law, the execution time of a parallel application over on a system with P nodes T(P) is:

$$T(P) = T(s) + T(p)/P$$

However, in Amdahl's law the communication overhead caused by an increased number of processors P is not considered; this communication overhead is expected to scale with the number of processors. Accounting for this effect permits a better model for scalability.

With the previous considerations in mind, a model is described below that can be used to estimate the general scalability of most applications with few parameters and few runs:

$$T(P) = x_1 + x_2 \frac{1}{P} + x_3 P \tag{1}$$

In the model in equation (1), x1 is a fixed time that is independent from the number of nodes P, x2(1/P) is a time that scales perfectly with the number of nodes; and x3P is a measure of the application overhead that increase with the number of nodes P.

Figure 2:
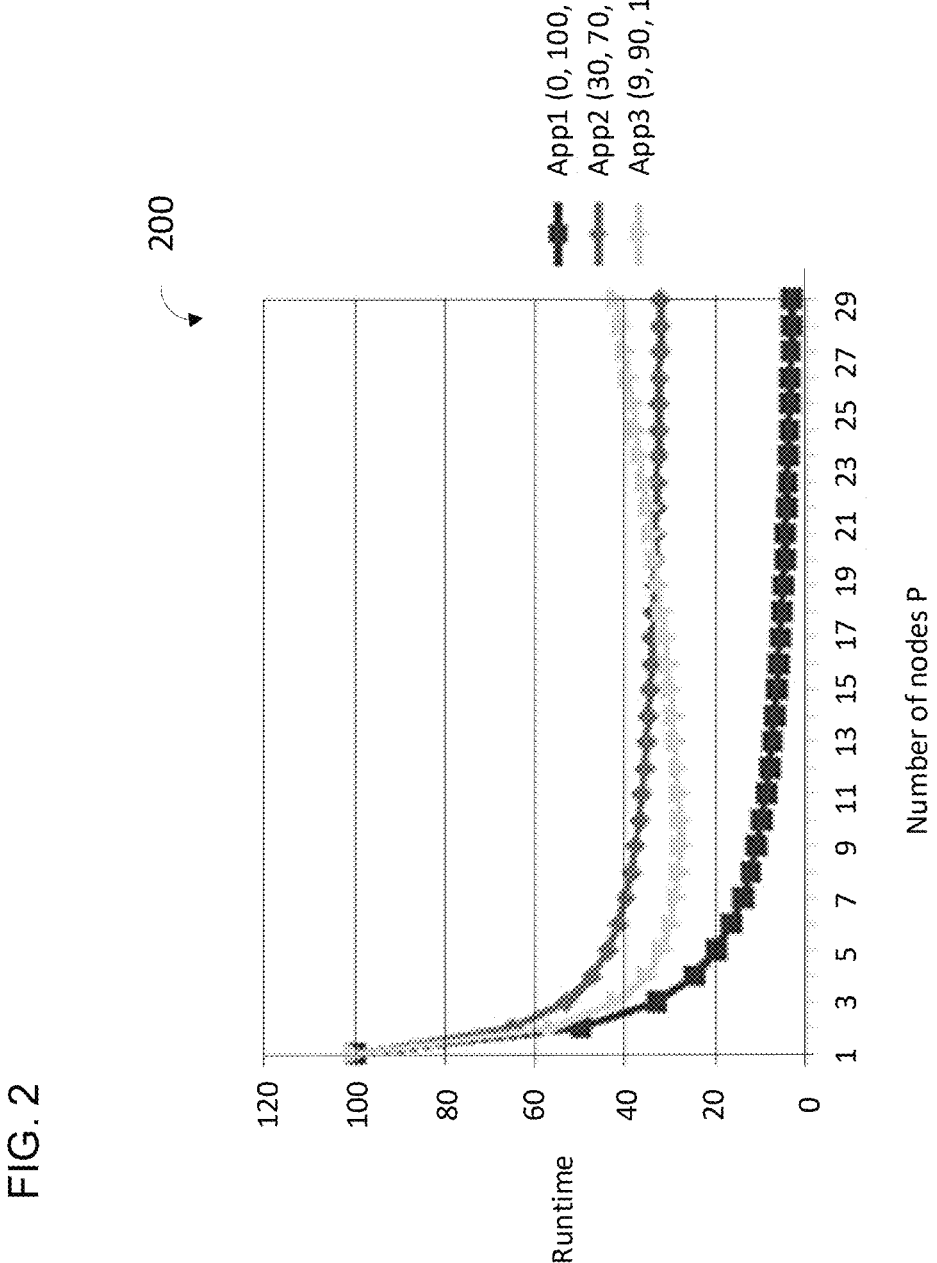
FIG. 2 is a graph of example data illustrating the relationship of T (runtime) versus P (number of nodes).

Turning now to FIG. 2, a graph 200 of test data illustrating the relationship of T (runtime) versus P (number of nodes) for three applications is shown. App1 has parameters (x1, x2, x3)=(0,100,0); App2 has parameters (x1, x2, x3)=(30, 70,0); and App3 has parameters (x1, x2, x3)=(9,90,1).

Figure 3:
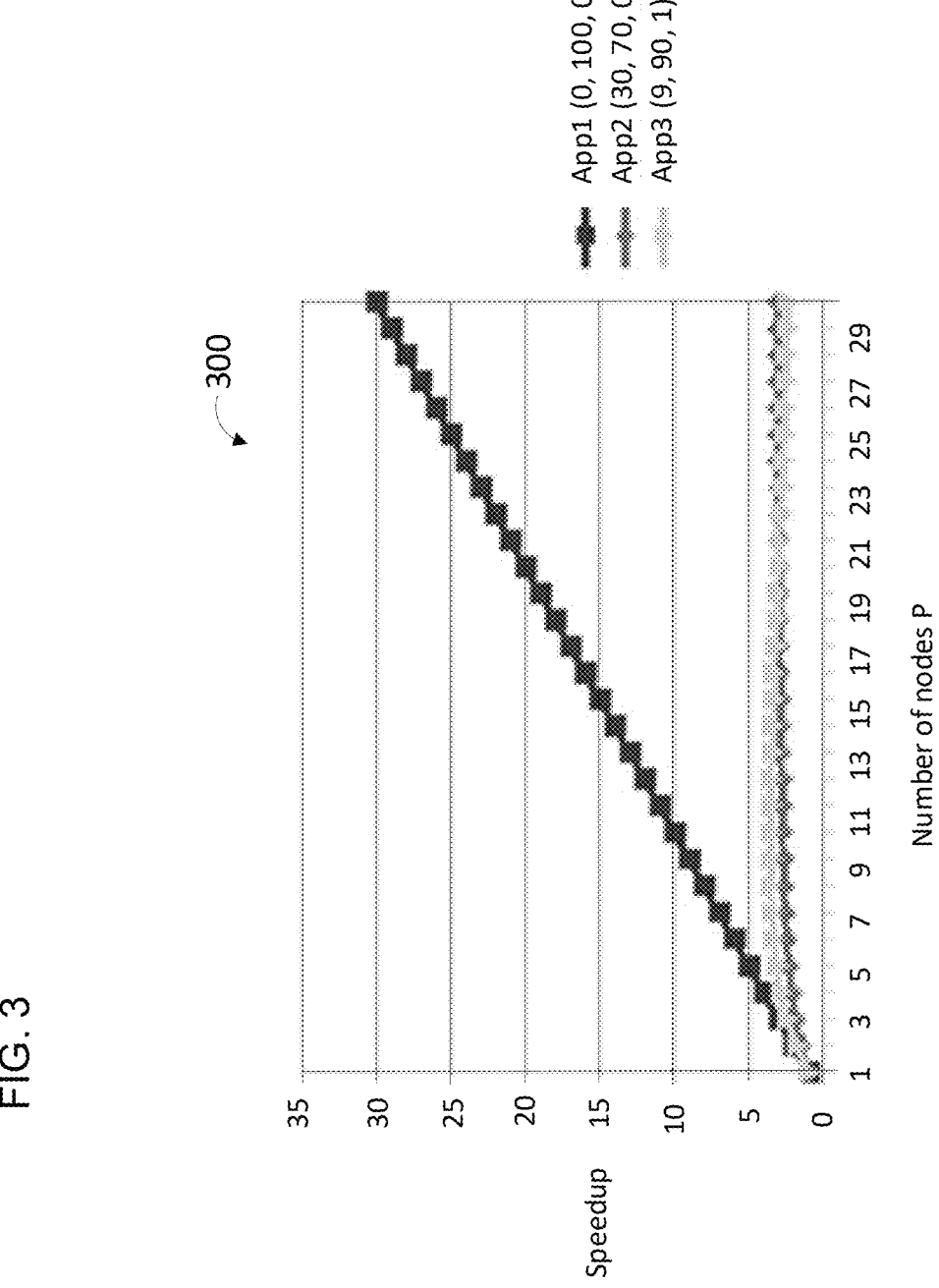
FIG. 3 is a graph of example data illustrating the relationship of the speedup in execution time versus P (number of nodes).

Turning now to FIG. 3, a graph 300 of test data illustrating the relationship of the speedup in execution time versus P (number of nodes) for the same three applications with the same parameters (x1, x2, x3) as in the previous example is shown.

Figure 4:
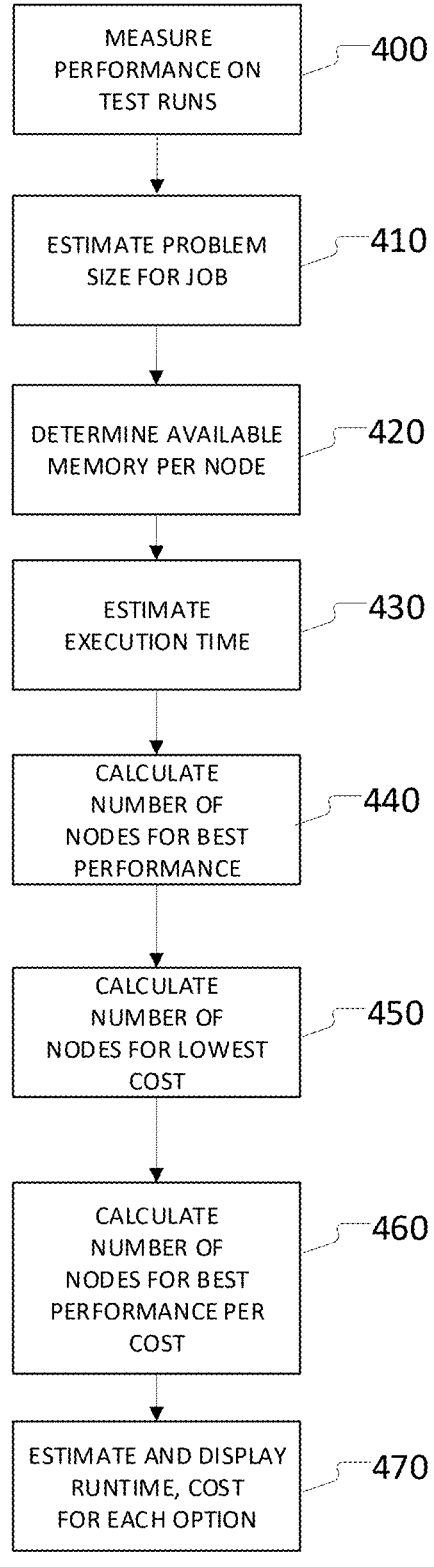
FIG. 4 is a flowchart of an example embodiment of a method for estimating application scalability performance.

Turning now to FIG. 4, one embodiment of a method for providing scalability information applying the model outlined above is shown. First, the job is run one or times with instrumentation to gather performance data (step 400). Next, a problem size n for the particular job is estimated (step 410). This parameter may be estimated from a previous run of the job as the total RAM memory usage provided that the nodes were not paging.

Next, the amount of RAM memory per node m available is determined (step 420). This may for example be determined from system configuration files or may be entered when new system configurations for cloud service providers are initially added to the system.

In one embodiment, execution time is estimated (step 430) based on equation 1 by summing the following terms:
(i) $x_1$, a fixed term that represent the serial time that does not scale with the number of nodes;
(ii) $x_2/P$, a term that represent the parallel time that scales with the number of nodes; and
(iii) $x_3P$, a term that represent the network overhead proportional to the number of nodes.

A hard threshold restriction term H that penalizes configurations where n>mP (where n is the problem size, m is the available memory per node and P is the number of nodes) may also be applied. The variables m and n may be estimated from the performance information of the other runs.

The parameters (x1, x2, x3) may be estimated from the previous runs of the job, provided that there are a number of previous jobs available to perform that estimation (e.g., at least three may be preferable).

If the number of previous job runs available is less than three or does not allow a good fitting of the parameters, an alternate estimate of the coefficients may be made as follows:
x1 will be the sum of the time spent by the job nodes sending or receiving messages plus the time spent by the job in disk operations (e.g., I/O time) divided by P;
x2 will be the job total time (sum of all nodes time spent in the job, e.g., execution time extracted from I/O interception libraries) divided by P minus x1; and
x3 will be set to a small value (e.g., zero).

With the scalability curve defined, estimated run-time can be determined, and the numbers of nodes that satisfy the three following policies may be calculated:
(i) Best performance as the number of nodes that minimizes the estimated run-time (step 440). This can be calculated by finding the P that minimizes T(P).
(ii) Lower cost, the number of nodes that minimizes the function CPT where C is the cost per node per hour, P is the number of nodes and T is the estimated run-time in hours (step 450). This can be calculated by finding the P that minimizes the price=Cost(P)*T(P).

iii) Best performance per cost as the average of nodes selected in policies (i) and (ii) above (step 460). This can for example be calculated by finding the P that minimize Cost(P)*T(P)^2.

In addition to these three estimated values, the estimated runtime for different numbers of nodes may also be displayed (step 470). The optimal solutions for the three policies may also displayed to the user, e.g., identified as highest performance, lowest cost, best value, etc., along with the calculated numbers of nodes, calculated estimated costs, etc.

Figure 5:
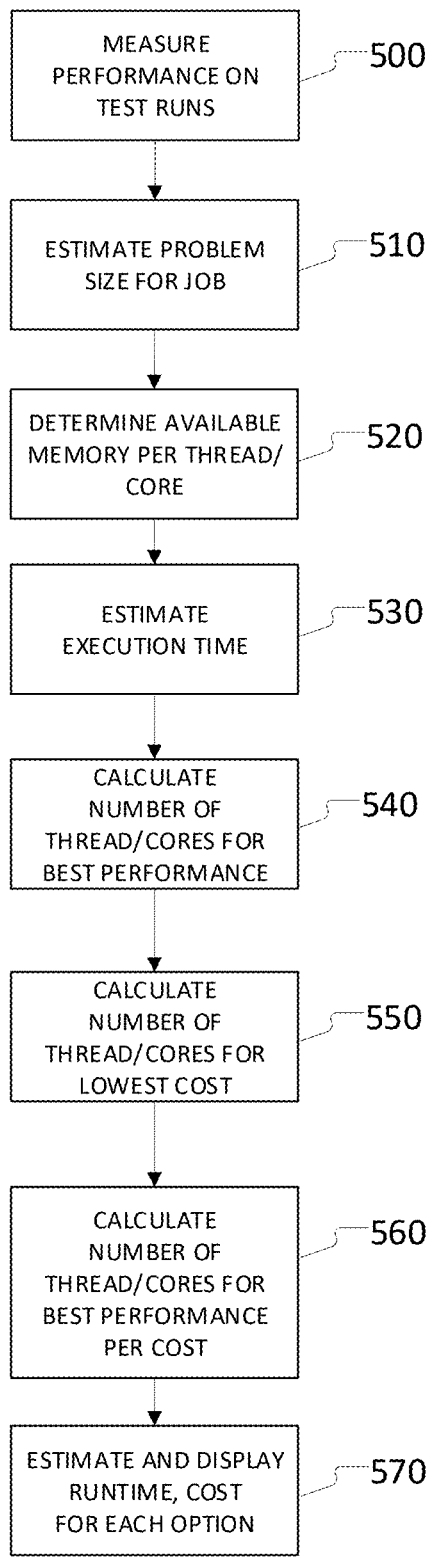
FIG. 5 is a flowchart of another example embodiment of a method for estimating application scalability performance.

Turning now to FIG. 5, another embodiment of a method for providing scalability information applying the model outlined above is shown. In this embodiment, recommendations are determined on a per-core or per-thread basis, rather than a per-node basis. Initially, the application/job being estimate is subjected to test runs with performance instrumentation on (step 500). As noted above, three or more test runs is preferable. The size of the problem (i.e., memory required for the problem) is then determined (step 510), as well as the amount of memory available per thread or core (step 520). This may be shared or local memory depending on the system architecture. The execution time is estimated (step 530) using equation (1), where P is the number of threads or cores rather than nodes. The number of threads/cores for best performance, lowest cost, and best performance per cost may be estimated, as described above using cores/threads instead of nodes (steps 540, 550, 560), and the results may then be displayed to the user (step 570). Using threads or cores effectively provides a higher resolution than relying on nodes. In some embodiments, both nodes and thread/cores may be estimated, and then both sets of estimates may be provided to the user. In other embodiments, users may be given the option of whether estimates should be on a per node or per core/thread basis.

In some embodiments, the estimated scalability curves may also include additional factors to account for the impact of queue size, etc. These additional constraints are optional and may depend on the specific architecture of the particular application in question. For example, scalability curves for applications may change based on changes made to the particular computing system or configuration (e.g., increasing the operating frequency of the processors, adding more cache, changing the interconnections between processors, etc.). In one embodiment, test runs of the application (or of benchmark tests that approximate the application) may be performed on different system configurations to estimate how changes in configurations may impact the application's scalability. This data may be used by a machine learning (ML) system to predict the impact of a change that has not yet been measured based on changes that have been measured. For example, if a particular type of workload (e.g., a test workload such as an image classification benchmark) was determined to have performance impacted by −15% in response to a 25% reduction in cache size and −30% in response to a 50% reduction in cache size, the ML system may be able to predict based on interpolation the performance impact of a 35% reduction in cache size for a user's image classification application). Thus, machine learning may be used to predict the scalability of applications on system configurations or with data sets (e.g., small data set versus larger data sets) that the system has not yet seen based on similar data that it has seen (i.e., measured).

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such elements. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." and "for example" in the specification is to be construed broadly and is used to provide non-limiting examples of embodiments of the disclosure, and the disclosure is not limited to such examples. Uses of "and" and "or" are to be construed broadly (e.g., to be treated as "and/or"). For example, and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for estimating job scalability on a computing system, the method comprising:

determining available memory for multiple processing cores in the computing system being evaluated for executing a job;

calculating one or more estimated execution times for the job;

wherein the one or more estimated execution times are estimated based on (i) a serial time estimate for the job, (ii) a parallel time estimate that scales with a number of cores of the multiple processing cores being evaluated for executing the job, and (iii) a network overhead estimate for the job; and wherein the serial time estimate, the parallel time estimate, and the network overhead estimate are derived from performance measurements taken from one or more prior executions of the job on other computer systems having similar cores and available memory per core as the computing system;

calculating a first estimated number of cores of the multiple processing cores for a performance option at which the one or more estimated execution times for the job is minimized;

calculating a second estimated number of cores of the multiple processing cores for a lowest cost option at which an estimated financial cost to execute the job is minimized;

displaying one or more numbers of cores including the first estimated number of cores and the second estimated number of cores;

scaling the job according to a selected number of cores of the one or more numbers of cores; and executing the scaled job on the computing system using the selected number of cores.

2. The method of claim 1, wherein determining the available memory is performed on a per-core or per-thread basis.

3. The method of claim 1, further comprising estimating a problem size for the job, wherein the problem size is estimated from a previous run of the job based on a total RAM memory usage without the multiple processing cores paging.

4. The method of claim 3, further comprising determining a hard threshold restriction (H) that penalizes configurations where n>mP, where n is the size of the problem, m is the available memory per core and P is the number of cores of the multiple processing cores being evaluated for executing the job.

5. The method of claim 1, wherein:

the serial time estimate for the job is a fixed term that does not scale with the number of cores of the multiple processing cores in the computing system being evaluated for executing the job; and the network overhead estimate is proportional to the number of cores of the multiple processing cores in the computing system being evaluated for executing the job.

6. The method of claim 1, further comprising performing one or more test runs of the job with performance instrumentation, wherein if a number of test runs is less than three, calculating the serial time estimate based on a sum of time spent by the number of cores of the multiple processing cores being evaluated for executing the job sending or receiving messages plus time spent by the job in disk operations divided by the number of cores of the multiple processing cores being evaluated for executing the job, and calculating the parallel time estimate based on a total job time divided by the number of cores of the multiple processing cores being evaluated for executing the job minus the serial time estimate.

7. The method of claim 1, further comprising:

calculating a third estimated number of cores of the multiple processing cores for a best performance per financial cost option;

calculating an estimated financial cost for the performance option at which the one or more estimated execution times for the job is minimized;

calculating an estimated financial cost for the lowest cost option;

calculating an estimated financial cost for the best performance per financial cost option; and displaying the estimated financial cost for the performance option at which the one or more estimated execution times for the job is minimized, the estimated financial cost for the lowest cost option, and the estimated financial cost for the best performance per financial cost option.

8. The method of claim 1, wherein the performance option is a best performance option.

9. A system for estimating a job's scalability in a computer system, comprising:

a memory;

one or more processors configured to execute instructions in the memory, which when executed cause the one or more processors to:

determine available memory for each core in a computing system being evaluated for executing a job;

calculate one or more estimated execution times for the job;

wherein the one or more estimated execution times are estimated based on (i) a serial time estimate for the job, (ii) a parallel time estimate that scales with a number of cores being evaluated for executing the job, and (iii) a network overhead estimate for the job; and wherein the serial time estimate, the parallel time estimate, and the network overhead estimate are based on performance measurements taken from one or more prior executions of the job on other computer systems having similar cores and available memory per core as the computing system;

calculate a first estimated number of cores of the computing system for a performance option at which the one or more estimated execution times for the job is minimized;

calculate a second estimated number of cores of the computing system for a lowest cost option at which an estimated financial cost to execute the job is minimized;

display one or more numbers of cores including the first estimated number of cores and the second estimated number of cores;

scale the job according to a selected number of cores of the one or more numbers of cores; and execute the scaled job on the computing system using the selected number of cores.

10. The system of claim 9, wherein the one or more processors calculate a third estimated number of cores of the computing system for a best performance per financial cost option.

11. The system of claim 9, wherein:

the one or more processors estimate a problem size for the job; and the problem size is estimated from a previous run of the job based on a total RAM memory usage without paging.

12. The system of claim 9, wherein:

the serial time estimate for the job is a fixed term that does not scale with the number of cores in the computing system being evaluated for executing the job; and the network overhead estimate is proportional to the number of cores in the computing system being evaluated for executing the job.

13. A system for estimating a job's scalability in a computer system, comprising:

a memory;

one or more processors configured to execute instructions in the memory, which when executed cause the one or more processors to:

determine available memory for a plurality of cores in the computing system being evaluated for executing a job;

determine one or more execution times for the job;

wherein the one or more execution times are estimated based on a serial time estimate for the job, a parallel time estimate that scales with a number of cores of the plurality of cores being evaluated for executing the job, and a network overhead estimate for the job; and wherein at least one of: the serial time estimate, the parallel time estimate, and the network overhead estimate are based on performance measurements taken from one or more prior executions of the job on the computer system; and the serial time estimate, the parallel time estimate, and the network overhead estimate are based on performance measurements taken from one or more prior executions of the job on other computer systems having similar cores and available memory per core as the computing system;

calculate one or more numbers of cores including (i) a first estimated number of cores of the computing system for a performance option that minimizes the one or more execution times for the job and (ii) a second estimated number of cores of the computing system for a lowest financial cost option;

scale the job according to a selected number of cores of the one or more numbers of cores; and execute the scaled job on the computing system using the selected number of cores; and a display that displays one or more of (i) and (ii).

14. The system of claim 13, wherein:

the one or more processors run one or more test workloads to measure one or more performance metrics for one or more cloud environments; and the one or more processors estimate the one or more execution times for the job based on the one or more performance metrics.

15. The system of claim 14, wherein:

the one or more processors collect the one or more performance metrics for the job once the job is being executed; and the one or more processors estimate a second execution time for a second job based on the one or more performance metrics.

16. The system of claim 13, wherein:

the one or more numbers of cores further includes a third estimated number of cores of the computing system for a best performance per financial cost option; and/or the serial time estimate for the job is a fixed term that does not scale with the number of cores of the plurality of cores in the computing system being evaluated for executing the job; and/or the network overhead estimate is proportional to the number of cores of the plurality of cores in the computing system being evaluated for executing the job.

17. The system of claim 13, wherein the instructions, when executed, further cause the one or more processors to:

perform one or more test runs of the job with performance instrumentation; and if the number of test runs is less than three:

calculate the serial time estimate based on a sum of time spent by the number of cores of the plurality of cores being evaluated for executing the job sending or receiving messages plus time spent by the job in disk operations divided by the number of cores of the plurality of cores being evaluated for executing the job; and calculate the parallel time estimate based on a total job time divided by the number of cores of the plurality of cores being evaluated for executing the job minus the serial time.

18. The system of claim 13 wherein the instructions, when executed, further cause the one or more processors to:

calculate a first estimated number of threads of the computing system for a best performance option at which the one or more estimated execution times for the job is minimized; and calculate a second estimated number of threads of the computing system for a lowest cost option at which an estimated financial cost to execute the job is minimized using the second estimated number of threads.

* * * * *